US012123335B2

United States Patent
Hikazudani et al.

(10) Patent No.: US 12,123,335 B2
(45) Date of Patent: Oct. 22, 2024

(54) EXHAUST GAS TREATMENT APPARATUS, ENGINE SYSTEM, AND EXHAUST GAS TREATMENT METHOD

(71) Applicant: HITACHI ZOSEN CORPORATION, Osaka (JP)

(72) Inventors: Susumu Hikazudani, Osaka (JP); Takahiro Fujibayashi, Osaka (JP); Emi Shono, Osaka (JP)

(73) Assignee: HITACHI ZOSEN CORPORATION, Osaka (JP)

( * ) Notice: Subject to any disclaimer, the term of this patent is extended or adjusted under 35 U.S.C. 154(b) by 0 days.

(21) Appl. No.: 18/560,246

(22) PCT Filed: Mar. 24, 2022

(86) PCT No.: PCT/JP2022/013951
§ 371 (c)(1),
(2) Date: Nov. 10, 2023

(87) PCT Pub. No.: WO2022/239506
PCT Pub. Date: Nov. 17, 2022

(65) Prior Publication Data
US 2024/0229695 A1 Jul. 11, 2024

(30) Foreign Application Priority Data
May 13, 2021 (JP) .................................. 2021-081912

(51) Int. Cl.
*F01N 3/00* (2006.01)
*F01N 3/20* (2006.01)
(Continued)

(52) U.S. Cl.
CPC ............. *F01N 3/2006* (2013.01); *F01N 3/24* (2013.01); *F02D 19/02* (2013.01); *F02D 2200/0802* (2013.01)

(58) Field of Classification Search
CPC .......... F01N 3/2006; F01N 3/24; F02D 19/02; F02D 2200/0802
See application file for complete search history.

(56) References Cited

U.S. PATENT DOCUMENTS

2015/0078975 A1\* 3/2015 Mahakul ................... F01N 9/00
422/108
2015/0128902 A1\* 5/2015 Joshi ................... F02D 19/0642
123/304

(Continued)

FOREIGN PATENT DOCUMENTS

JP 2010144563 A \* 7/2010
JP 2011-001829 A 1/2011
(Continued)

OTHER PUBLICATIONS

International Preliminary Report on Patentability and Transmittal dated Nov. 14, 2023, issued in corresponding International Application No. PCT/JP2022/013951 with English translation (14 pgs.).
(Continued)

*Primary Examiner* — Matthew T Largi
(74) *Attorney, Agent, or Firm* — Pillsbury Winthrop Shaw Pittman, LLP

(57) ABSTRACT

An exhaust gas treatment apparatus includes a treatment cabinet and a catalyst part. To the treatment cabinet, introduced is exhaust gas of an engine which uses gas containing methane as a fuel. The catalyst part is accommodated in the treatment cabinet and oxidizes unburned methane contained in the exhaust gas. When a temperature of the catalyst part is lower than a predetermined normal operating temperature, the catalyst part oxidizes carbon monoxide contained in the exhaust gas and uses oxidation reaction heat of carbon monoxide, to thereby raise the temperature of the catalyst part up to the normal operating temperature or higher. Even when the temperature of the exhaust gas supplied to the
(Continued)

catalyst part is lower than the normal operating temperature, it is thereby possible to quickly raise the temperature of the catalyst part up to the normal operating temperature por higher.

8 Claims, 3 Drawing Sheets

(51) Int. Cl.
  *F01N 3/24* (2006.01)
  *F02D 19/02* (2006.01)

(56) References Cited

U.S. PATENT DOCUMENTS

| | | | | |
|---|---|---|---|---|
| 2017/0146238 | A1* | 5/2017 | Stender | C04B 7/364 |
| 2018/0252169 | A1* | 9/2018 | Takahashi | F02B 11/00 |
| 2019/0234281 | A1* | 8/2019 | Wiebenga | F01N 13/0093 |
| 2022/0090528 | A1* | 3/2022 | Staller | F01N 3/36 |

FOREIGN PATENT DOCUMENTS

| | | |
|---|---|---|
| JP | 2013-146726 A | 8/2013 |
| JP | 2016-125478 A | 7/2016 |
| JP | 2018135808 A * | 8/2018 |

OTHER PUBLICATIONS

International Search Report dated May 17, 2022, issued in corresponding Japanese Patent Application No. PCT/JP2022/013951 with English translation (5 pgs.).

Notice of Reasons for Refusal dated Feb. 8, 2024, issued in corresponding Japanese Patent Application No. 2021-081912 with English translation (8 pgs.).

* cited by examiner

EXHAUST GAS TREATMENT APPARATUS, ENGINE SYSTEM, AND EXHAUST GAS TREATMENT METHOD

CROSS REFERENCE TO RELATED APPLICATION

The present application claims priority to International Application No. PCT/JP2022/013951, filed Mar. 24, 2022, which claims priority to Japanese Patent Application No. 2021-081912 filed on May 13, 2021, the content of each of which is incorporated herein by reference in its entirety.

TECHNICAL FIELD

The present invention relates to a technique for treating exhaust gas.

BACKGROUND ART

Conventionally, in an LNG tanker which carries liquefied natural gas (LNG), boil off gas (BOG) which is inevitably generated from the LNG that is a cargo is used as fuel gas. Further, in recent years, the number of ships which use LNG as fuel gas has been increasing, even other than the LNG tanker.

Thus, in the ship using LNG as fuel gas, in a case where a combustion temperature of the fuel gas in an engine is low, or the like case, there is a possibility that part of methane ($CH_4$) in the fuel gas may remain unburned in exhaust gas and may be emitted into the atmosphere together with the exhaust gas. Since the global warming effect of methane is relatively high, it is required to prevent emission of methane into the atmosphere by treating the methane in the exhaust gas with a catalyst or the like. In an exhaust gas purification apparatus disclosed in Japanese Patent Application Laid Open Gazette No. 2018-135808 (Document 1), for example, a catalyst is used to oxidize hydrocarbon and carbon monoxide contained in exhaust gas of a gas engine.

In Document 1, the temperature of the catalyst, in which methane can be oxidized, is not lower than 350° C. and lower than 500° C. Therefore, when the temperature of the exhaust gas introduced into the exhaust gas purification apparatus is lower than 350° C., it is difficult to suitably oxidize methane in the exhaust gas.

SUMMARY OF THE INVENTION

The present invention is intended for an exhaust gas treatment apparatus, and it is an object of the present invention to suitably oxidize methane in exhaust gas even when an exhaust gas temperature is low.

The exhaust gas treatment apparatus according to one preferred embodiment of the present invention includes a treatment cabinet into which exhaust gas of an engine which uses gas containing methane as a fuel is introduced and a catalyst part accommodated in the treatment cabinet, for oxidizing unburned methane contained in the exhaust gas. When a temperature of the catalyst part is lower than a predetermined normal operating temperature, the catalyst part oxidizes carbon monoxide contained in the exhaust gas and uses oxidation reaction heat of carbon monoxide, to thereby raise the temperature of the catalyst part up to the normal operating temperature or higher.

According to the present invention, it is possible to suitably oxidize methane in the exhaust gas even when an exhaust gas temperature is low.

Preferably, when the temperature of the catalyst part is lower than the normal operating temperature, a tuning state of the engine is made to be a predetermined tuning state in which a concentration of carbon monoxide contained in the exhaust gas is higher than that during a steady operation.

Preferably, when the tuning state of the engine is the predetermined tuning state, the concentration of carbon monoxide contained in the exhaust gas is not lower than 0.04 volume % and not higher than 2.5 volume %.

Preferably, when the temperature of the catalyst part is lower than a first switching temperature which is lower than the normal operating temperature, the tuning state of the engine is made to be a first tuning state in which the concentration of carbon monoxide contained in the exhaust gas is higher than that during the steady operation. When the temperature of the catalyst part is raised up to the first switching temperature, the tuning state of the engine is made to be a second tuning state in which the concentration of carbon monoxide contained in the exhaust gas is higher than that during the steady operation and is lower than that in the first tuning state.

Preferably, the exhaust gas treatment apparatus further includes an introduction temperature sensor for measuring a temperature of the exhaust gas introduced into the treatment cabinet.

Preferably, the treatment cabinet is disposed on an upstream side relative to a turbine rotated by the exhaust gas in a flow direction of the exhaust gas.

Preferably, the treatment cabinet is disposed on a downstream side relative to a turbine rotated by the exhaust gas in a flow direction of the exhaust gas.

The present invention is also intended for an engine system. The engine system according to one preferred embodiment of the present invention includes an engine using gas containing methane as a fuel and the above-described exhaust gas treatment apparatus for treating exhaust gas of the engine.

Preferably, the engine is a two-stroke engine.

The present invention is still also intended for an exhaust gas treatment method for oxidizing unburned methane in exhaust gas of an engine which uses gas containing methane as a fuel. The exhaust gas treatment method according to one preferred embodiment of the present invention includes a) supplying a catalyst part with exhaust gas having a temperature lower than a predetermined normal operating temperature, b) oxidizing carbon monoxide contained in the exhaust gas in the catalyst part and using oxidation reaction heat of carbon monoxide, to thereby raise a temperature of the catalyst part up to the normal operating temperature or higher, and c) oxidizing methane in the exhaust gas by the catalyst part having a temperature not lower than the normal operating temperature after the operation b).

These and other objects, features, aspects and advantages of the present invention will become more apparent from the following detailed description of the present invention when taken in conjunction with the accompanying drawings.

DESCRIPTION OF EMBODIMENTS

Figure 1:
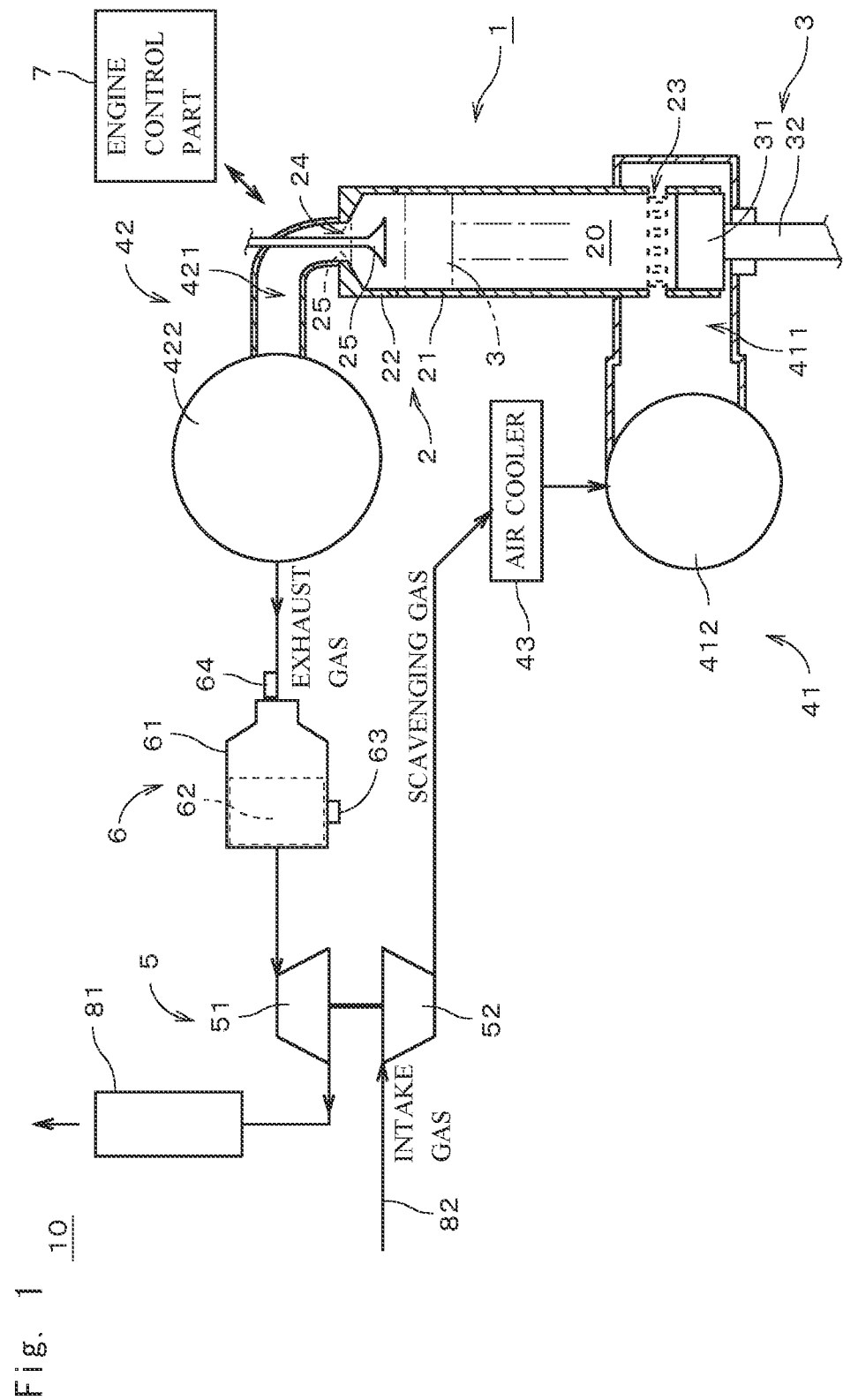
FIG. 1 is a view showing a configuration of an engine system in accordance with one preferred embodiment.

FIG. 1 is a view showing a configuration of an engine system 10 in accordance with one preferred embodiment of the present invention. The engine system 10 is mounted on, for example, an LNG tanker which carries liquefied natural gas (LNG). The engine system 10 is used as, for example, a main engine of the LNG tanker.

The engine system 10 includes an engine 1 and an exhaust gas treatment apparatus 6.

The engine 1 is a gas engine using gas containing methane ($CH_4$) as a fuel. The engine 1 is, for example, a two-stroke engine. The engine 1 is a reciprocating internal combustion engine using a combustion method such as an Otto cycle, a premixed combustion, a diesel cycle, a Sabathe cycle, or the like. The engine 1 is, for example, a low-pressure engine. The engine 1 may use boil off gas (BOG) of liquefied natural gas (LNG) as a fuel. BOG is, for example, gas generated when LNG which is a cargo is vaporized in the LNG tanker, and contains methane.

The engine 1 includes a cylinder 2, a piston 3, a scavenging passage 41, an exhaust passage 42, an air cooler 43, a supercharger 5, an engine control part 7, and a flue 81. The cylinder 2 is a substantially covered cylindrical member with a central axis extending in an up-and-down direction of FIG. 1, as its center. The piston 3 is a substantially columnar member with the central axis as its center, and an upper portion thereof is disposed inside the cylinder 2. The piston 3 is movable in the up-and-down direction. Further, the up-and-down direction of FIG. 1 does not necessarily need to be parallel to the direction of gravity.

The cylinder 2 includes a cylinder liner 21, a cylinder cover 22, and an exhaust valve 25. The cylinder liner 21 is a substantially cylindrical member with the above-described central axis as its center. The cylinder cover 22 is a substantially covered cylindrical member attached to an upper portion of the cylinder liner 21. In a top cover of the cylinder cover 22, formed is an exhaust port 24. The exhaust port 24 is connected to the exhaust passage 42. The exhaust port 24 gets opened and closed by the exhaust valve 25. As indicated by a solid line in FIG. 1, when the exhaust valve 25 gets separated downward from the exhaust port 24, the exhaust port 24 gets opened. Further, as indicated by a two-dot chain line in FIG. 1, when the exhaust valve 25 comes into contact with the cylinder cover 22 and overlaps the exhaust port 24, the exhaust port 24 gets closed. In the vicinity of a lower end portion of the cylinder liner 21, provided is a scavenging port 23. The scavenging port 23 is a set of many through holes formed on a side surface of the cylinder liner 21, being circumferentially arranged. The scavenging port 23 is connected to the scavenging passage 41.

The piston 3 includes a piston crown 31 and a piston rod 32. The piston crown 31 is a substantially disk-like thick portion with the above-described central axis as its center. The piston crown 31 is disposed inside the cylinder liner 21. The piston rod 32 is a substantially columnar portion extending downward from a lower surface of the piston crown 31. A lower end portion of the piston rod 32 is connected to a not-shown crank mechanism. By the crank mechanism, the piston 3 is reciprocated in the up-and-down direction. In FIG. 1, the piston 3 positioned at a bottom dead center of the reciprocation is represented by a solid line and the piston 3 positioned at a top dead center thereof is represented by a two-dot chain line.

In the engine 1, a space surrounded by the cylinder liner 21, the cylinder cover 22, the exhaust valve 25, and an upper surface of the piston crown 31 (i.e., an upper surface of the piston 3) is a combustion chamber 20 in which a fuel and air are burned.

To the combustion chamber 20, scavenging gas is supplied from the scavenging passage 41 through the above-described scavenging port 23. The scavenging passage 41 includes a scavenging chamber 411 and a scavenging receiver 412. The scavenging chamber 411 is a space (i.e., a scavenging pipe) provided around the scavenging port 23 of the cylinder liner 21. The scavenging port 23 communicates with the scavenging receiver 412 through the scavenging chamber 411. The scavenging receiver 412 is a substantially cylindrical large-scale container for supplying the scavenging gas to the scavenging chamber 411.

Gas (i.e., combustion gas) generated by burning the fuel and the air in the combustion chamber 20 is discharged into the exhaust passage 42 through the exhaust port 24. The exhaust passage 42 is a conduit line in which the gas (hereinafter, referred to as "exhaust gas") discharged from the combustion chamber 20 flows. The exhaust passage 42 includes an exhaust pipe 421 and an exhaust receiver 422. The exhaust pipe 421 is a pipe connecting the exhaust port 24 and the exhaust receiver 422 to each other. The exhaust receiver 422 is a substantially cylindrical large-scale container for receiving the exhaust gas from the combustion chamber 20.

Though not shown, in the engine 1, a plurality of pairs of cylinders 2 and pistons 3 are provided and a plurality of combustion chambers 20 are connected to one scavenging receiver 412 and one exhaust receiver 422. In other words, the scavenging receiver 412 is a scavenging manifold for distributing and supplying the scavenging gas to the plurality of combustion chambers 20. Further, the exhaust receiver 422 is an exhaust manifold (also referred to as an exhaust collector pipe) for collecting the exhaust gases discharged from the plurality of combustion chambers 20.

The exhaust gas collected to the exhaust receiver 422 is treated by the exhaust gas treatment apparatus 6. In the exhaust gas treatment apparatus 6, unburned (i.e., unreacted) methane contained in the exhaust gas from the combustion chambers 20 is oxidized, to thereby generate carbon dioxide ($CO_2$) and water ($H_2O$). A concentration (hereinafter, also referred to as a "slip methane concentration") of unburned methane contained in the exhaust gas discharged from the engine system 10 into the atmosphere is thereby made not higher than a default value. The exhaust gas treatment apparatus 6 includes a treatment cabinet 61, a catalyst part 62, a catalyst temperature sensor 63, and an introduction temperature sensor 64.

In the exhaust gas treatment apparatus 6, the exhaust gas from the combustion chamber 20 is introduced into an internal space of the treatment cabinet 61. The treatment cabinet 61 is, for example, a substantially cylindrical reaction container. In the internal space of the treatment cabinet 61, the catalyst part 62 is accommodated (i.e., loaded). The catalyst part 62 is, for example, an oxidation catalyst having a honeycomb structure. Specifically, the catalyst part 62 has a structure in which the oxidation catalyst such as a catalytic metal or the like is supported by a carrier having a honeycomb structure. The catalytic metal includes, for example, a precious metal such as palladium (Pd), platinum (Pt), or the like. In the exhaust gas treatment apparatus 6, when the exhaust gas introduced into the treatment cabinet 61 passes through the catalyst part 62, the unburned methane contained in the exhaust gas is oxidized by the catalyst part 62. Further, the catalyst part 62 also oxidizes carbon monoxide (CO) contained in the exhaust gas. Furthermore, respective structures and shapes of the treatment cabinet 61 and the catalyst part 62 may be changed in various manners. For example, the carrier of the catalyst part 62 may have any other shape such as a cylindrical shape, a flat plate-like shape, or the like.

The catalyst temperature sensor 63 measures a temperature of the catalyst part 62 and outputs the measured temperature to the engine control part 7. The catalyst temperature sensor 63 may measure a temperature of the internal space of the treatment cabinet 61 and output a measurement result to the engine control part 7 as the temperature of the catalyst part 62. The introduction temperature sensor 64 measures a temperature of the exhaust gas at the point in time when the exhaust gas is introduced into the treatment cabinet 61 and outputs the measured temperature to the engine control part 7. The introduction temperature sensor 64 is provided just before an introduction port of the treatment cabinet 61 in the pipe connecting the exhaust receiver 422 and the treatment cabinet 61 to each other. As the catalyst temperature sensor 63 and the introduction temperature sensor 64, for example, a thermocouple can be used.

In the exhaust gas treatment apparatus 6, a predetermined normal operating temperature is set and when the temperature of the catalyst part 62 is not lower than the normal operating temperature, oxidation of the methane in the exhaust gas is sufficiently performed and the slip methane concentration becomes not higher than the above-described default value. The normal operating temperature may be, for example, the temperature of the catalyst part 62 at the time when the slip methane concentration becomes equal to the default value or may be a temperature obtained by adding a predetermined margin (e.g., 10° C. to 50° C. to the temperature. The normal operating temperature is, for example, set by a manufacturer who manufactures the exhaust gas treatment apparatus 6 or the engine system 10, or the like. Though the normal operating temperature is changed in various manners depending on the type of the catalyst part 62, or the like, the normal operating temperature is, for example, 400° ° C. under the condition that the feed flow rate of the exhaust gas into the catalyst part 62 is 0.1 m/sec to 3.0 m/sec. Further, when the temperature of the catalyst part 62 is lower than the normal operating temperature, there is a possibility that the slip methane concentration may exceed the above-described default value.

The supercharger 5 is a turbocharger which includes a turbine 51 and a compressor 52. The supercharger 5 pressurizes intake gas by using the exhaust gas, to thereby generate scavenging gas. Specifically, the turbine 51 is rotated by the exhaust gas from the combustion chamber 20, and the compressor 52 uses a rotating force generated in the turbine 51 (in other words, uses the rotation of the turbine 51 as a power) to pressurize and compress the intake gas (air) taken in from the outside of the engine 1 through an intake path 82. The pressurized air (i.e., the above-described scavenging gas) is cooled by the air cooler 43, and then is supplied to the scavenging receiver 412 and further supplied from the scavenging receiver 412 to the combustion chamber 20. The exhaust gas used for the rotation of the turbine 51 is guided to the flue 81 and discharged from the flue 81 to the outside of the engine 1. In the exemplary case shown in FIG. 1, the turbine 51 is disposed between the flue 81 and the treatment cabinet 61 of the exhaust gas treatment apparatus 6. In other words, the treatment cabinet 61 is disposed on an upstream side relative to the turbine 51 rotated by the exhaust gas in a flow direction of the exhaust gas discharged from the combustion chamber 20. The exhaust gas after being treated by the catalyst part 62 in the treatment cabinet 61 is introduced into the turbine 51.

The engine control part 7 controls a tuning state of the engine 1 on the basis of an output (i.e., the temperature of the catalyst part 62) from the catalyst temperature sensor 63 of the exhaust gas treatment apparatus 6. The engine control part 7 is, for example, a programmable logic controller (PLC). The PLC includes a processor, a memory, an input/output part, and a bus. The bus is a signal circuit for connecting the processor, the memory, and the input/output part to one another. The memory stores therein a program and various information. The processor performs various processings (for example, numerical calculation or the like) while using the memory and the like in accordance with the program and the like stored in the memory. The input/output part receives a signal input from any other apparatus (for example, the exhaust gas treatment apparatus 6) and an input from an operator, and outputs a signal to any other apparatus. The PLC performs a processing on the basis of a predetermined program, to thereby implement functions of the engine control part 7. The engine control part 7 may be a general-type computer system including a keyboard, a display, and the like, or may be a circuit board or the like.

In the engine system 10, at the startup of the engine 1, during a low-power operation, or the like, the temperature of the exhaust gas transferred from the combustion chamber 20 to the exhaust gas treatment apparatus 6 is sometimes relatively low. The temperature outputted from the introduction temperature sensor 64 to the engine control part 7 (i.e., the temperature of the exhaust gas at the point in time when the exhaust gas is introduced into the treatment cabinet 61) is, for example, sometimes lower than the above-described normal operating temperature. In such a case where the temperature of the exhaust gas to be introduced into the treatment cabinet 61 is relatively low, since oxidation of the methane by the catalyst part 62 hardly proceeds and oxidation reaction heat generated by the oxidation is little in the conventional exhaust gas treatment apparatus, there is a possibility that the temperature of the catalyst part 62 cannot reach the above-described normal operating temperature.

Figure 2:
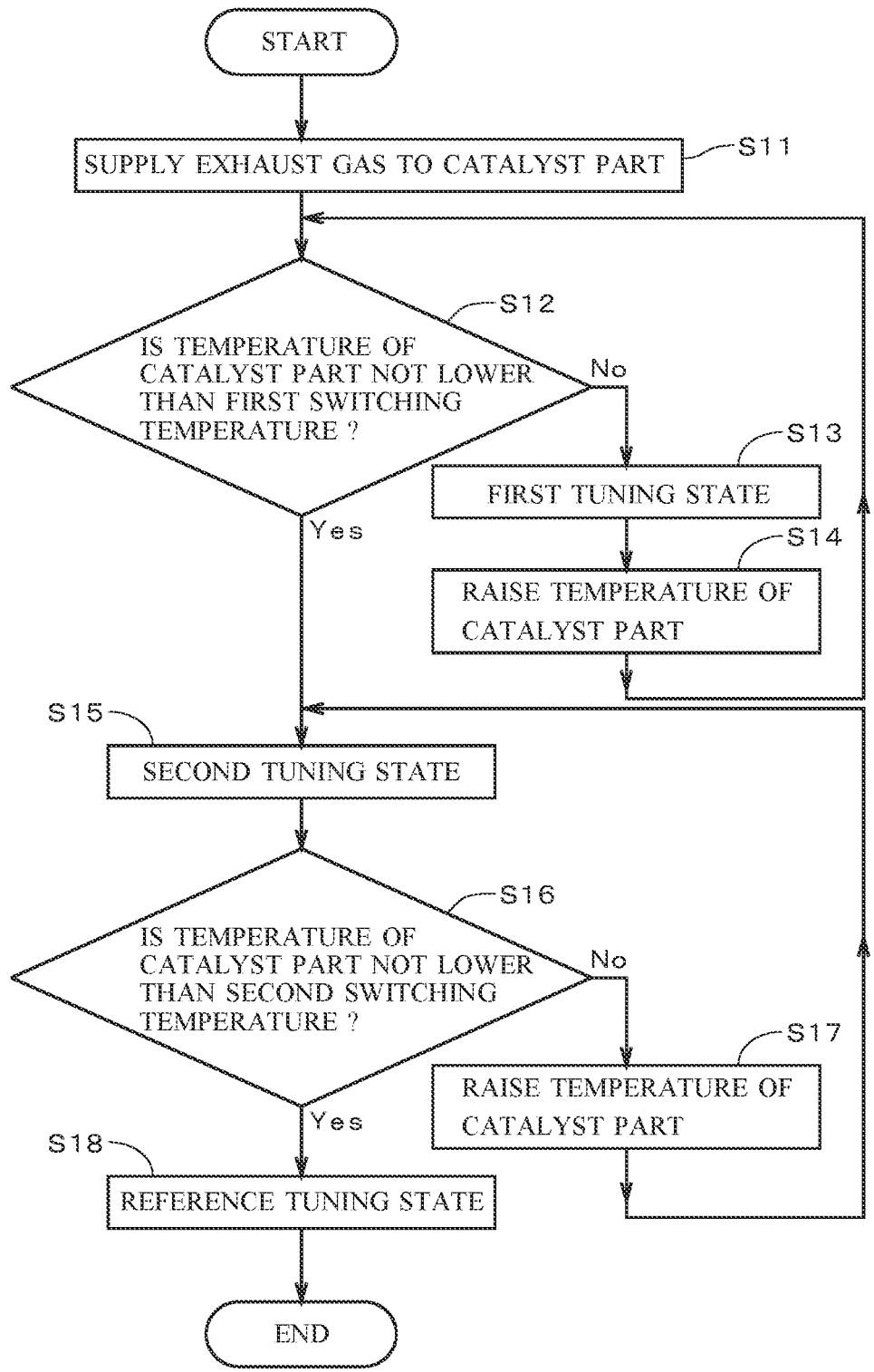
FIG. 2 is a flowchart showing an operation flow for treatment of exhaust gas.

FIG. 2 is a flowchart showing an operation flow for treatment of the exhaust gas in the engine system 10 in accordance with the present invention. In the engine system 10, in a state where the temperature of the catalyst part 62 is measured by the catalyst temperature sensor 63, the exhaust gas from the combustion chamber 20 is supplied to the catalyst part 62 (Step S11). As described above, when the temperature of the exhaust gas to be introduced into the treatment cabinet 61 (i.e., the temperature of the exhaust gas to be supplied to the catalyst part 62) is lower than the normal operating temperature, there is a possibility that the temperature of the catalyst part 62 may be also lower than the normal operating temperature. At the startup of the engine 1, during the low-power operation, or the like, the temperature of the exhaust gas at the point in time when the exhaust gas is introduced into the treatment cabinet 61 (hereinafter, also referred to as an "inlet exhaust gas temperature") is, for example, lower than 250° C., and a difference between the normal operating temperature and the inlet exhaust gas temperature (i.e., a value obtained by subtracting the inlet exhaust gas temperature from the normal operating temperature) is, for example, not lower than 90° C. The inlet exhaust gas temperature is not lower than an oxidation onset temperature (i.e., a temperature at the time when heat generation due to the oxidation reaction of carbon monoxide starts). The inlet exhaust gas temperature is, for example, 150° C. to 350° C.

When the temperature of the catalyst part 62, which is transmitted from the catalyst temperature sensor 63 to the engine control part 7, is lower than a predetermined first switching temperature (Step S12), the engine control part 7 controls the tuning state of the engine 1 to be changed into a first tuning state different from the tuning state (hereinafter, also referred to as a "reference tuning state") during a steady operation (Step S13). Specifically, when the tuning state of the engine 1 is the reference tuning state or a tuning state other than the first tuning state, the engine control part 7 changes the tuning state of the engine 1 into the first tuning state. Further, when the tuning state of the engine 1 is the first tuning state, the first tuning state is maintained. The above-described first switching temperature is a temperature lower than the normal operating temperature, and for example, a temperature not lower than the oxidation onset temperature of methane (i.e., a temperature at the time when heat generation due to the oxidation reaction of methane starts). The first switching temperature is set as appropriate in advance in accordance with the use manner or the like of the engine system 10.

In the first tuning state, the concentration of carbon monoxide contained in the exhaust gas discharged from the combustion chamber 20 is higher than that in the reference tuning state. The carbon monoxide concentration in the exhaust gas in the first tuning state is, for example, not lower than 0.05 volume %, and preferably not lower than 0.5 volume %. The carbon monoxide concentration in the exhaust gas in the first tuning state is, for example, not higher than 5 volume %, preferably not higher than 4 volume %, more preferably not higher than 2.5 volume %, and further preferably not higher than 1 volume %. In the present preferred embodiment, the carbon monoxide concentration in the exhaust gas in the first tuning state is made not lower than 0.05 volume % and not higher than 2.5 volume %. Further, the above-described steady operation refers to an operation state during the navigation scheduled in a normal operation of a ship on which the engine system 10 is mounted, and the reference tuning state is set so that the fuel economy and the environmental load of the engine 1 during the steady operation can be substantially optimal. The carbon monoxide concentration in the exhaust gas in the reference tuning state is, for example, not lower than 0.005 volume % and lower than 0.04 volume %.

Further, the methane concentration in the exhaust gas in the reference tuning state is, for example, 0.5 volume % to 1.5 volume %. The methane concentration in the exhaust gas in the first tuning state may be the same as that in the reference tuning state or may be different therefrom. In the present preferred embodiment, the methane concentration in the exhaust gas in the first tuning state is substantially the same as that in the reference tuning state and for example, 0.5 volume % to 1.5 volume %. By making the methane concentration in the exhaust gas not lower than 0.5 volume %, it is possible to perform the oxidation of methane in the catalyst part 62 with high efficiency. Further, by making the methane concentration in the exhaust gas not higher than 1.5 volume %, it is possible to prevent excessive temperature rise of the catalyst part 62 due to the oxidation reaction heat of methane in the catalyst part 62.

Switching of the tuning state of the engine 1 is performed, for example, when at least one of the amount of fuel to be supplied into the combustion chamber 20, the amount of air sealed in the combustion chamber 20, and the maximum pressure in the combustion chamber 20 (also referred to as the "maximum combustion pressure") is changed. Specifically, for example, by increasing the amount of fuel to be supplied into the combustion chamber 20 (hereinafter, also referred to as the "amount of fuel supply"), the amount of air inside the combustion chamber 20 is relatively reduced and the carbon monoxide concentration in the exhaust gas to be discharged from the combustion chamber 20 increases. The amount of fuel supply can be changed by controlling an operation of a fuel supply pump in a not-shown fuel supply part, or the like.

Further, for example, by reducing the amount of air sealed in the combustion chamber 20 (hereinafter, also referred to as the "amount of sealed air"), the carbon monoxide concentration in the exhaust gas to be discharged from the combustion chamber 20 increases. Also by reducing the maximum pressure in the combustion chamber 20, the carbon monoxide concentration in the exhaust gas to be discharged from the combustion chamber 20 increases. The amount of sealed air and the maximum pressure in the combustion chamber 20 can be changed by controlling a closing timing of the exhaust valve 25 at the rise of the piston 3 from the bottom dead center, or the like. Specifically, for example, by delaying the above-described closing timing of the exhaust valve 25, the amount of sealed air is reduced and the maximum pressure in the combustion chamber 20 becomes lower.

Further, in the switching of the tuning state of the engine 1, there may be a case where the engine control part 7 controls any element other than the above, to thereby change at least one of the amount of fuel supply, the amount of sealed air, and the maximum pressure in the combustion chamber 20. Alternatively, there may be a case where by controlling any element other than the amount of fuel supply, the amount of sealed air, and the maximum pressure in the combustion chamber 20, the tuning state of the engine 1 is switched.

The onset temperature of oxidation of carbon monoxide by the catalyst part 62 is lower than the normal operating temperature and the onset temperature of oxidation of methane by the catalyst part 62 and not higher than the temperature of the exhaust gas to be supplied into the catalyst part 62 (i.e., the inlet exhaust gas temperature). Therefore, carbon monoxide in the exhaust gas is oxidized by the catalyst part 62. The temperature of the catalyst part 62 is raised due to the oxidation reaction heat of carbon monoxide (Step S14). Further, the onset temperature of oxidation of carbon monoxide by the catalyst part 62 is changed in various manners depending on the type of the catalyst part 62 or the like, but is, for example, 200° ° C. under the condition that the feed flow rate of the exhaust gas into the catalyst part 62 is 0.1 m/sec to 3.0 m/sec.

In the engine system 10, as described above, since the tuning state of the engine 1 is changed to the first tuning state and the carbon monoxide concentration in the exhaust gas is increased, the amount of oxidation reaction heat of carbon monoxide oxidized by the catalyst part 62 is large. Therefore, the temperature of the catalyst part 62 is quickly raised and reaches the above-described oxidation onset temperature of methane, After the temperature of the catalyst part 62 rises up to the oxidation onset temperature of methane, oxidation of methane in the exhaust gas by the catalyst part 62 is substantially started. The temperature of the catalyst part 62 is raised up to a temperature not lower than the above-described normal operating temperature due to the oxidation reaction heat of carbon monoxide and the oxidation reaction heat of methane. Then, the oxidation of carbon monoxide and methane in the exhaust gas is continuously performed by the catalyst part 62 having a temperature not lower than the normal operating temperature.

In the exhaust gas treatment apparatus 6, measurement of the temperature of the catalyst part 62 is continuously performed by the catalyst temperature sensor 63, and when the temperature of the catalyst part 62, which is transmitted from the catalyst temperature sensor 63 to the engine control part 7, reaches the first switching temperature (Step S12), the engine control part 7 controls the tuning state of the engine 1, to thereby change the tuning state from the first tuning state to second tuning state (Step S15). Further, even during the low-power operation or the like, in a case where the temperature of the catalyst part 62, which is transmitted from the catalyst temperature sensor 63 to the engine control part 7, is not lower than the first switching temperature and lower than the normal operating temperature from the beginning (Step S12), or the like case, the tuning state of the engine 1 may be changed into the second tuning state not through the first tuning state (Step S15).

In the second tuning state, the concentration of carbon monoxide contained in the exhaust gas discharged from the combustion chamber 20 is lower than that in the first tuning state. Further, the carbon monoxide concentration in the exhaust gas in the second tuning state is higher than that in the reference tuning state. The carbon monoxide concentration in the exhaust gas in the second tuning state is, for example, not lower than 0.04 volume %, and preferably not lower than 0.4 volume %. The carbon monoxide concentration in the exhaust gas in the second tuning state is, for example, not higher than 4 volume %, preferably not higher than 2 volume %, and more preferably not higher than 0.75 volume %. In the present preferred embodiment, the carbon monoxide concentration in the exhaust gas in the second tuning state is made not lower than 0.04 volume % and not higher than 2 volume %. In other words, in the present preferred embodiment, the carbon monoxide concentration in the exhaust gas in the first tuning state and the second tuning state is not lower than 0.04 volume % and not higher than 2.5 volume %. Further, the carbon monoxide concentration in the exhaust gas in the first tuning state and the second tuning state is not limited within the above-described range but may be changed in various manners. The methane concentration in the exhaust gas in the second tuning state may be the same as that in the reference tuning state or may be different therefrom. In the present preferred embodiment, the methane concentration in the exhaust gas in the second tuning state is substantially the same as that in the reference tuning state and for example, 0.5 volume % to 1.5 volume %.

As described above, in the second tuning state as compared with those in the first tuning state, the carbon monoxide concentration in the exhaust gas is reduced and the amount of oxidation reaction heat of carbon monoxide in the catalyst part 62 is also reduced. On the other hand, in the catalyst part 62 whose temperature is raised, oxidation of methane as well as carbon monoxide also occurs. Since the amount of oxidation reaction heat (i.e., combustion heat) of methane per unit amount of substance is larger than that of carbon monoxide per unit amount of substance, the temperature of the catalyst part 62 is raised up to not lower than the first switching temperature and raised up to a predetermined second switching temperature not lower than the normal operating temperature due to the oxidation reaction heat of carbon monoxide and the oxidation reaction heat of methane (Steps S16 and S17). Like the first switching temperature, the second switching temperature is also set as appropriate in advance in accordance with the use manner or the like of the engine system 10.

Then, after the temperature of the catalyst part 62 reaches the second switching temperature (Step S16), the engine control part 7 controls the tuning state of the engine 1, to thereby change the tuning state from the second tuning state to reference tuning state (Step S18). In the exhaust gas treatment apparatus 6, since the temperature of the catalyst part 62 is raised up to not lower than the normal operating temperature, also in the reference tuning state, it is possible to suitably oxidize methane in the exhaust gas discharged from the combustion chamber 20, by the catalyst part 62. As a result, it is possible to suppress emission of methane (i.e., methane slip) into the atmosphere from the engine system 10. Further, when the temperature of the catalyst part 62, which is transmitted from the catalyst temperature sensor 63 to the engine control part 7, is not lower than the second switching temperature from the beginning, the tuning state of the engine 1 may be changed into the reference state not through the first tuning state nor the second tuning state, unlike the operation flow shown in FIG. 2.

As described above, the exhaust gas treatment apparatus 6 includes the treatment cabinet 61 and the catalyst part 62. To the treatment cabinet 61, introduced is the exhaust gas of the engine 1 which uses gas containing methane as a fuel. The catalyst part 62 is accommodated in the treatment cabinet 61 and oxidizes unburned methane contained in the exhaust gas. When the temperature of the catalyst part 62 is lower than the predetermined normal operating temperature, the catalyst part 62 oxidizes carbon monoxide contained in the exhaust gas and uses the oxidation reaction heat of carbon monoxide, to thereby raise the temperature of the catalyst part 62 up to the normal operating temperature or higher. Even when the temperature of exhaust gas supplied to the catalyst part 62 is lower than the normal operating temperature, it is thereby possible to quickly raise the temperature of the catalyst part 62 up to the normal operating temperature or higher. Therefore, it is possible to suitably oxidize methane in the exhaust gas and suitably suppress the methane slip. As a result, the slip methane concentration can be made not higher than the above-described default value As described above, when the temperature of the catalyst part 62 is lower than the normal operating temperature, it is preferable that the tuning state of the engine 1 should be brought into the predetermined tuning state (i.e., the first tuning state and/or the second tuning state) in which the concentration of carbon monoxide contained in the exhaust gas is higher than that during the steady operation. It is thereby possible to increase the amount of oxidation reaction heat of carbon monoxide in the catalyst part 62 and more quickly raise the temperature of the catalyst part 62 up to the above-described normal operating temperature.

As described above, when the tuning state of the engine 1 is the above-described predetermined tuning state, it is preferable that the concentration of carbon monoxide contained in the exhaust gas should be not lower than 0.04 volume % and not higher than 2.5 volume %. By making the carbon monoxide concentration not lower than 0.04 volume %, it is possible to further increase the amount of oxidation reaction heat of carbon monoxide in the catalyst part 62 and still more quickly (for example, within 120 minutes from the start of supply of the exhaust gas to the catalyst part 62) raise the temperature of the catalyst part 62 up to the above-described normal operating temperature. Further, by making the carbon monoxide concentration not higher than 2.5 volume %, it is possible to suppress deterioration of fuel economy in the above-described tuning state (i.e., in the first tuning state and/or the second tuning state) as compared with high fuel economy during the steady operation.

As described above, preferably, when the temperature of the catalyst part 62 is lower than the first switching temperature lower than the normal operating temperature, the tuning state of the engine 1 is brought into the first tuning state in which the concentration of carbon monoxide contained in the exhaust gas is higher than that during the steady operation. Further, preferably, when the temperature of the catalyst part 62 is raised up to the first switching temperature, the tuning state of the engine 1 is brought into the second tuning state in which the concentration of carbon monoxide contained in the exhaust gas is higher than that during the steady operation and lower than that in the first tuning state. It is thereby possible to reduce the amount of oxidation reaction heat of carbon monoxide in the catalyst part 62 and prevent excessive temperature rise of the catalyst part 62 in a state where the temperature of the catalyst part 62 is not lower than the first switching temperature. Furthermore, since the tuning state of the engine 1 becomes closer to the reference tuning state than the first tuning state, it is possible to further suppress the deterioration of fuel economy as compared with that during the steady operation. As a result, it is possible to suitably suppress the methane slip while suppressing the deterioration of fuel economy, from the state where the exhaust gas temperature is low, such as at the start of operation or the like, to during the steady operation.

As described above, even when the temperature of the exhaust gas supplied to the catalyst part 62 is lower than the normal operating temperature, the exhaust gas treatment apparatus 6 can suitably oxidize methane contained in the exhaust gas. Therefore, the exhaust gas treatment apparatus 6 is especially suitable for the case where the temperature of the catalyst part 62 does not easily rise up to the normal operating temperature since the temperature of the exhaust gas introduced into the treatment cabinet 61 (i.e., the inlet exhaust gas temperature) is low. For example, the exhaust gas treatment apparatus 6 is especially suitable for the case where a difference between the temperature of the exhaust gas introduced into the treatment cabinet 61 and the normal operating temperature is 90° C. or more.

As described above, it is preferable that the exhaust gas treatment apparatus 6 should further include the introduction temperature sensor 64 for measuring the temperature (i.e., the inlet exhaust gas temperature) of the exhaust gas introduced into the treatment cabinet 61. It is thereby possible to easily detect a state where the inlet exhaust gas temperature is low and the above-described switching or the like of the tuning state is needed.

As described above, it is preferable that the treatment cabinet 61 should be disposed on the upstream side relative to the turbine 51 rotated by the exhaust gas in the flow direction of the exhaust gas. It is thereby possible to introduce the exhaust gas having a higher temperature to the treatment cabinet 61, as compared with after passing through the turbine 51. As a result, since the temperature of the catalyst part 62 can be raised up to the normal operating temperature more quickly, it is possible to perform oxidation of methane in the catalyst part 62 with high efficiency.

Figure 3:
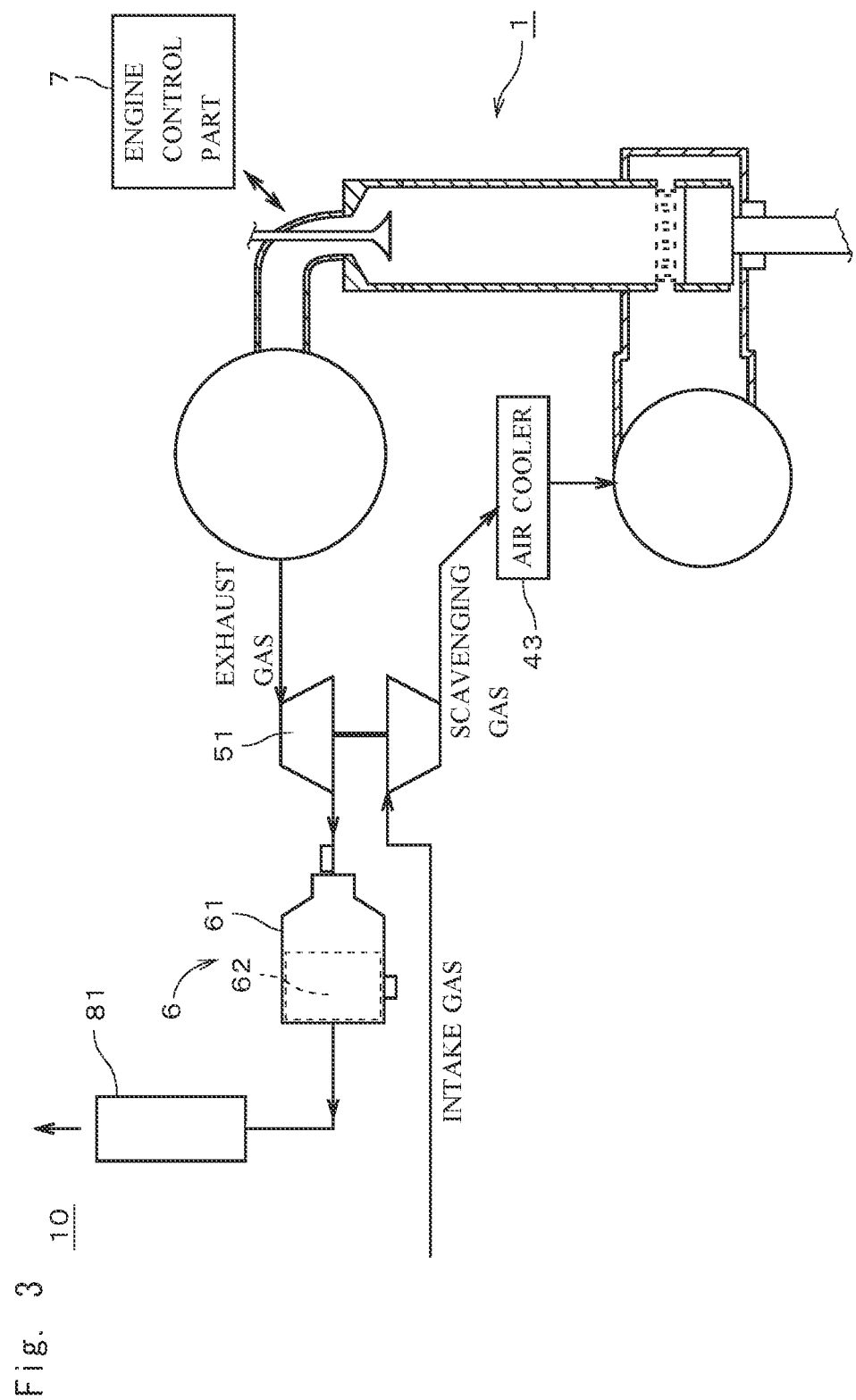
FIG. 3 is a view showing a configuration of another engine system.

Further, as shown in FIG. 3, it is also preferable that the treatment cabinet 61 should be disposed on the downstream side relative to the turbine 51 rotated by the exhaust gas in the flow direction of the exhaust gas. It is thereby possible to introduce the exhaust gas having a lower pressure to the treatment cabinet 61, as compared with before passing through the turbine 51. As a result, it is possible to simplify the configuration of the treatment cabinet 61. Further, since it is not necessary to change the main structure of the engine 1 in the installation of the exhaust gas treatment apparatus 6, it is possible to easily retrofit the already-existing ship with the exhaust gas treatment apparatus 6. Further, as described above, since the exhaust gas treatment apparatus 6 can suitably oxidize methane even when the temperature of the exhaust gas supplied to the catalyst part 62 is low, it is possible to suitably oxidize methane in the exhaust gas whose temperature is reduced due to passing through the turbine 51. In the exemplary case shown in FIG. 3, the treatment cabinet 61 is disposed between the flue 81 and the turbine 51 and the exhaust gas used for the rotation of the turbine 51 is introduced into the treatment cabinet 61.

The engine system 10 shown in FIGS. 1 and 3 includes the engine 1 which uses gas containing methane as a fuel and the above-described exhaust gas treatment apparatus 6 which treats the exhaust gas of the engine 1. It is thereby possible to suppress the methane slip from the engine system 10 even when the temperature of the exhaust gas is low. Therefore, the engine system 10 is especially suitable for the case where a two-stroke engine whose exhaust gas temperature is relatively low is used as the engine 1. Further, the engine system 10 is especially suitable for the case where a low-pressure two-stroke engine having a tendency to increase the methane slip, as compared with a high-pressure two-stroke engine, is used as the engine 1.

The above-described exhaust gas treatment method is a method for oxidizing unburned methane in the exhaust gas of the engine 1 which uses gas containing methane as a fuel. The exhaust gas treatment method includes a step of supplying the catalyst part 62 with exhaust gas having a temperature lower than the predetermined normal operating temperature (Step S11), a step of oxidizing carbon monoxide contained in the exhaust gas in the catalyst part 62 and using oxidation reaction heat of carbon monoxide, to thereby raise the temperature of the catalyst part 62 up to the normal operating temperature or higher (Step S14), and a step of oxidizing methane in the exhaust gas by the catalyst part 62 having a temperature not lower than the normal operating temperature after Step S14 (Step S15). In the same manner as above, since the temperature of the catalyst part 62 can be quickly raised up to the normal operating temperature even when the temperature of the exhaust gas supplied to the catalyst part 62 is lower than the normal operating temperature, it is thereby possible to suitably oxidize methane contained in the exhaust gas.

In the exhaust gas treatment apparatus 6, the engine system 10, and the exhaust gas treatment method described above, various modifications can be made.

For example, the difference between the temperature of the exhaust gas introduced into the treatment cabinet 61 and the normal operating temperature may be smaller than 90° C.

Further, in a case where the temperature of the exhaust gas discharged from the combustion chamber 20 is lower than the oxidation onset temperature of carbon monoxide, or the like case, in order to promote the oxidation of carbon monoxide by the catalyst part 62, the exhaust gas transferred from the combustion chamber 20 to the treatment cabinet 61 and/or the catalyst part 62 may be heated by a boiler steam, a heater, or the like. The heating is continued, for example, until the temperature of the catalyst part 62 rises up to the oxidation onset temperature of carbon monoxide or higher.

In the exhaust gas treatment apparatus 6, it is not always necessary to switch the tuning state of the engine 1 on the basis of a temperature measurement result by the catalyst temperature sensor 63. There may be a case, for example, where a table or the like indicating a relation between operating conditions such as an elapsed time from a startup of the engine 1, an output power (the number of rotation), and the like, and the exhaust gas temperature and the temperature of the catalyst part 62 is prepared and the exhaust gas temperature and the temperature of the catalyst part 62 are estimated from the actual operating conditions and the table or the like. In this case, the catalyst temperature sensor 63 may be omitted. Further, in the exhaust gas treatment apparatus 6, the introduction temperature sensor 64 may be omitted.

The control of the tuning state of the engine 1 by the engine control part 7 is not limited to the above-described exemplary case but may be changed in various manners. For example, after switching the tuning state of the engine 1 from the first tuning state to the second tuning state, when the temperature of the catalyst part 62 decreases to be lower than the above-described first switching temperature for some reason, the tuning state of the engine 1 may be switched from the second tuning state to the first tuning state. Alternatively, the tuning state of the engine 1 may be switched from the second tuning state to a third tuning state where the concentration of carbon monoxide in the exhaust gas is between those in the first tuning state and the second tuning state. Further, in the control of the tuning state of the engine 1, it is not always necessary to perform the switching from the first tuning state to the second tuning state. Specifically, for example, in a case where the second tuning state is not set in the engine 1 and the temperature of the catalyst part 62 is lower than the above-described second switching temperature, the tuning state of the engine 1 is maintained to be the first tuning state and when the temperature of the catalyst part 62 reaches the second switching temperature, the tuning state is switched directly from the first tuning state to the reference tuning state. In this case, it is preferable that the concentration of carbon monoxide in the exhaust gas in the first tuning state should be not lower than 0.04 volume % and not higher than 2.5 volume %. Further, the switching of the tuning state of the engine 1 does not necessarily need to be performed automatically by the engine control part 7 but may be performed manually by the operator.

In order to make the carbon monoxide concentration in the exhaust gas higher than that during the steady operation, it is also not always necessary to switch the tuning state of the engine 1 from the reference tuning state during the steady operation to the first tuning state. There may be a case, for example, where a gas separation apparatus or the like is disposed between the combustion chamber 20 and the treatment cabinet 61 and the gas separation apparatus or the like increases the carbon monoxide concentration in the exhaust gas introduced into the treatment cabinet 61. Alternatively, exhaust gas recirculation (EGR) may be performed, to thereby reduce an oxygen concentration of the scavenging gas and increase the carbon monoxide concentration in the exhaust gas.

Though the catalyst part 62 includes one oxidation catalyst used for the oxidation of carbon monoxide and methane in the above-described exemplary case, as described above, the configuration and shape of the catalyst part 62 may be changed in various manners. For example, the catalyst part 62 may include a first oxidation catalyst used for the oxidation of carbon monoxide and a second oxidation catalyst used for the oxidation of methane. The first oxidation catalyst and the second oxidation catalyst are different types of oxidation catalysts. In this case, the first oxidation catalyst is disposed on an upstream side of the flow of the exhaust gas inside the treatment cabinet 61 and the second oxidation catalyst is disposed on a downstream side relative to the first oxidation catalyst. To the second oxidation catalyst, the exhaust gas passing through the first oxidation catalyst is supplied. In the catalyst part 62, carbon monoxide in the exhaust gas is oxidized when the exhaust gas flowing in the treatment cabinet 61 passes through the first oxidation catalyst, and the exhaust gas whose temperature is raised due to the oxidation reaction heat of carbon monoxide is supplied to the second oxidation catalyst. Also in this case, in substantially the same manner as above, it is possible to quickly raise the temperature of the second oxidation catalyst in the catalyst part 62 up to the normal operating temperature or higher. Therefore, it is possible to suitably oxidize methane in the exhaust gas and suitably suppress the methane slip. Further, in the second oxidation catalyst, both the oxidation of carbon monoxide and that of methane may be performed.

The engine 1 may use LNG which is prepared as a fuel for the engine 1, instead of BOG, as a fuel. Alternatively, the engine 1 may be a dual fuel engine which can switch between fuel gas containing methane and a heavy oil fuel, to be used.

The engine 1 may be a four-stroke engine. Further, the engine 1 may be a high-pressure engine using a combustion method such as a diesel cycle or diffusion combustion.

The engine system 10 may be used as a main engine of a ship other than the LNG tanker or may be used for any use other than the main engine of a ship.

The configurations in the above-described preferred embodiment and variations may be combined as appropriate only if those do not conflict with one another.

While the invention has been shown and described in detail, the foregoing description is in all aspects illustrative and not restrictive. It is therefore understood that numerous modifications and variations can be devised without departing from the scope of the invention.

REFERENCE SIGNS LIST

1 Engine
6 Exhaust gas treatment apparatus
10 Engine system
51 Turbine
61 Treatment cabinet
62 Catalyst part
S11 to S18 Step

The invention claimed is:

1. An exhaust gas treatment apparatus, comprising:
a treatment cabinet into which exhaust gas of an engine that uses gas containing methane as a fuel is introduced;
a catalyst part accommodated in said treatment cabinet, for oxidizing unburned methane contained in said exhaust gas; and
a processor and a memory storing instructions that cause the processor to:
when a temperature of said catalyst part is lower than a first switching temperature that is lower than a predetermined normal operating temperature, make a tuning state of said engine to be a first tuning state in which a concentration of carbon monoxide contained in said exhaust gas is higher than that during a steady operation, and said catalyst part oxidizes carbon monoxide contained in said exhaust gas and uses oxidation reaction heat of carbon monoxide, to thereby raise the temperature of said catalyst part up to said normal operating temperature or higher, and
when the temperature of said catalyst part is raised up to said first switching temperature, make said tuning state of said engine to be a second tuning state in which the concentration of carbon monoxide contained in said exhaust gas is higher than that during said steady operation and is lower than that in said first tuning state.

2. The exhaust gas treatment apparatus according to claim 1, wherein, when said tuning state of said engine is said first tuning state, the concentration of carbon monoxide contained in said exhaust gas is not lower than 0.04 volume % and not higher than 2.5 volume %.

3. The exhaust gas treatment apparatus according to claim 1, further comprising:
    an introduction temperature sensor for measuring a temperature of said exhaust gas introduced into said treatment cabinet.

4. The exhaust gas treatment apparatus according to claim 1, wherein said treatment cabinet is disposed on an upstream side relative to a turbine rotated by said exhaust gas in a flow direction of said exhaust gas.

5. The exhaust gas treatment apparatus according to claim 1, wherein said treatment cabinet is disposed on a downstream side relative to a turbine rotated by said exhaust gas in a flow direction of said exhaust gas.

6. An engine system, comprising:
    an engine using gas containing methane as a fuel; and
    said exhaust gas treatment apparatus according to claim 1, for treating said exhaust gas of said engine.

7. The engine system according to claim 6, wherein said engine is a two-stroke engine.

8. An exhaust gas treatment method for oxidizing unburned methane in exhaust gas of an engine which uses gas containing methane as a fuel, comprising:
    supplying a catalyst part with exhaust gas having a temperature lower than a predetermined normal operating temperature;
    making a tuning state of an engine to be a first tuning state in which a concentration of carbon monoxide contained in said exhaust gas is higher than that during a steady operation when the temperature of said catalyst part is lower than a first switching temperature which is lower than said predetermined normal operating temperature, and oxidizing said carbon monoxide contained in said exhaust gas in said catalyst part and using oxidation reaction heat of carbon monoxide, to thereby raise a temperature of said catalyst part up to said predetermined normal operating temperature or higher; and
    oxidizing methane in said exhaust gas by said catalyst part having a temperature not lower than said predetermined normal operating temperature after said operation of making the tuning state to be the first tuning state, and
    when the temperature of said catalyst part is raised up to said first switching temperature, making said tuning state of said engine to be a second tuning state in which the concentration of carbon monoxide contained in said exhaust gas is higher than that during said steady operation and is lower than that in said first tuning state.

* * * * *